United States Patent
Ogawa et al.

(10) Patent No.: US 7,755,703 B2
(45) Date of Patent: Jul. 13, 2010

(54) IMAGING SYSTEM

(75) Inventors: Mayu Ogawa, Osaka (JP); Kazuyuki Inokuma, Kyoto (JP); Toshiya Fujii, Shiga (JP)

(73) Assignee: Panasonic Corporation, Osaka (JP)

( * ) Notice: Subject to any disclaimer, the term of this patent is extended or adjusted under 35 U.S.C. 154(b) by 373 days.

(21) Appl. No.: 11/878,836

(22) Filed: Jul. 27, 2007

(65) Prior Publication Data

US 2008/0024669 A1   Jan. 31, 2008

(30) Foreign Application Priority Data

Jul. 31, 2006   (JP)   ................ 2006-207696

(51) Int. Cl.
*H04N 5/21*   (2006.01)

(52) U.S. Cl. ........................ 348/614; 382/266; 382/274; 382/275

(58) Field of Classification Search ................ 382/275, 382/266, 274; 348/614
See application file for complete search history.

(56) References Cited

U.S. PATENT DOCUMENTS

| | | | | |
|---|---|---|---|---|
| 4,951,125 A | * | 8/1990 | Kojima et al. ............... | 348/580 |
| 5,477,272 A | * | 12/1995 | Zhang et al. ............ | 375/240.06 |
| 6,088,059 A | | 7/2000 | Mihara et al. | |
| 7,221,779 B2 | * | 5/2007 | Kawakami et al. .......... | 382/107 |
| 2003/0179948 A1 | | 9/2003 | Gindele et al. | |
| 2004/0114815 A1 | * | 6/2004 | Shibaki et al. .............. | 382/233 |
| 2005/0093992 A1 | * | 5/2005 | Fukumoto ................ | 348/222.1 |

FOREIGN PATENT DOCUMENTS

JP   11-355636   12/1999

* cited by examiner

*Primary Examiner*—Jason Chan
*Assistant Examiner*—Yih-Sien Kao
(74) *Attorney, Agent, or Firm*—McDermott Will & Emery LLP

(57) ABSTRACT

A signal processing circuit generates an image signal by performing signal processing to an imaging signal obtained through a picked up optical system that includes a lens, a diaphragm, an image sensor, and a lens barrel. A main light source detector detects a main light source contained in a picked up image of the image signal. An estimated ghost generator generates an estimated ghost based on layout information of the main light source and the imaging optical system, and structural information of the lens barrel. A matching device extracts an estimated ghost image by searching the estimated ghost in the picked up image through pattern matching. A ghost subtractor subtracts the estimated ghost image from the picked up image.

20 Claims, 13 Drawing Sheets

Pi Picked up image

Matching reference block

F I G. 7
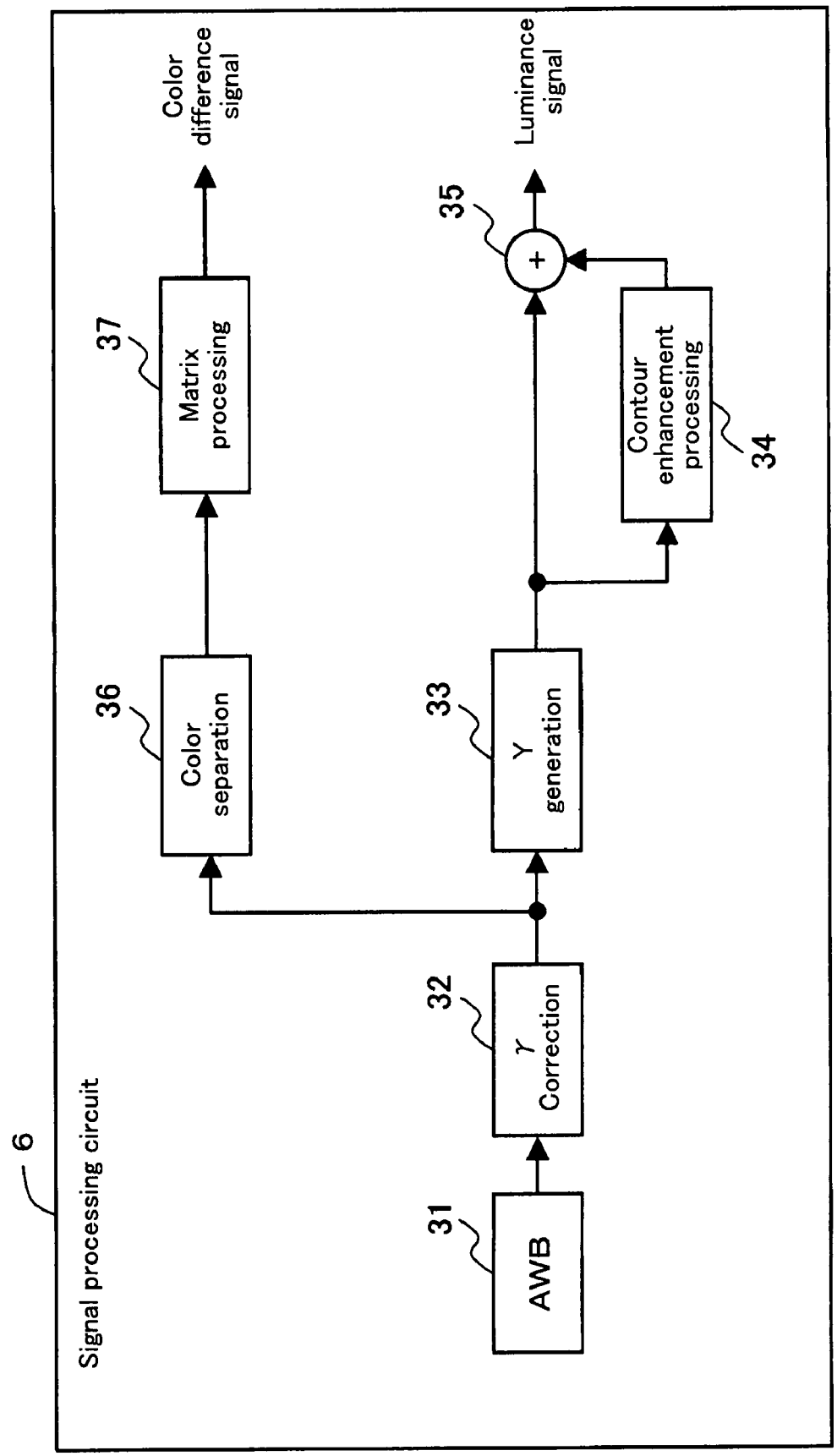

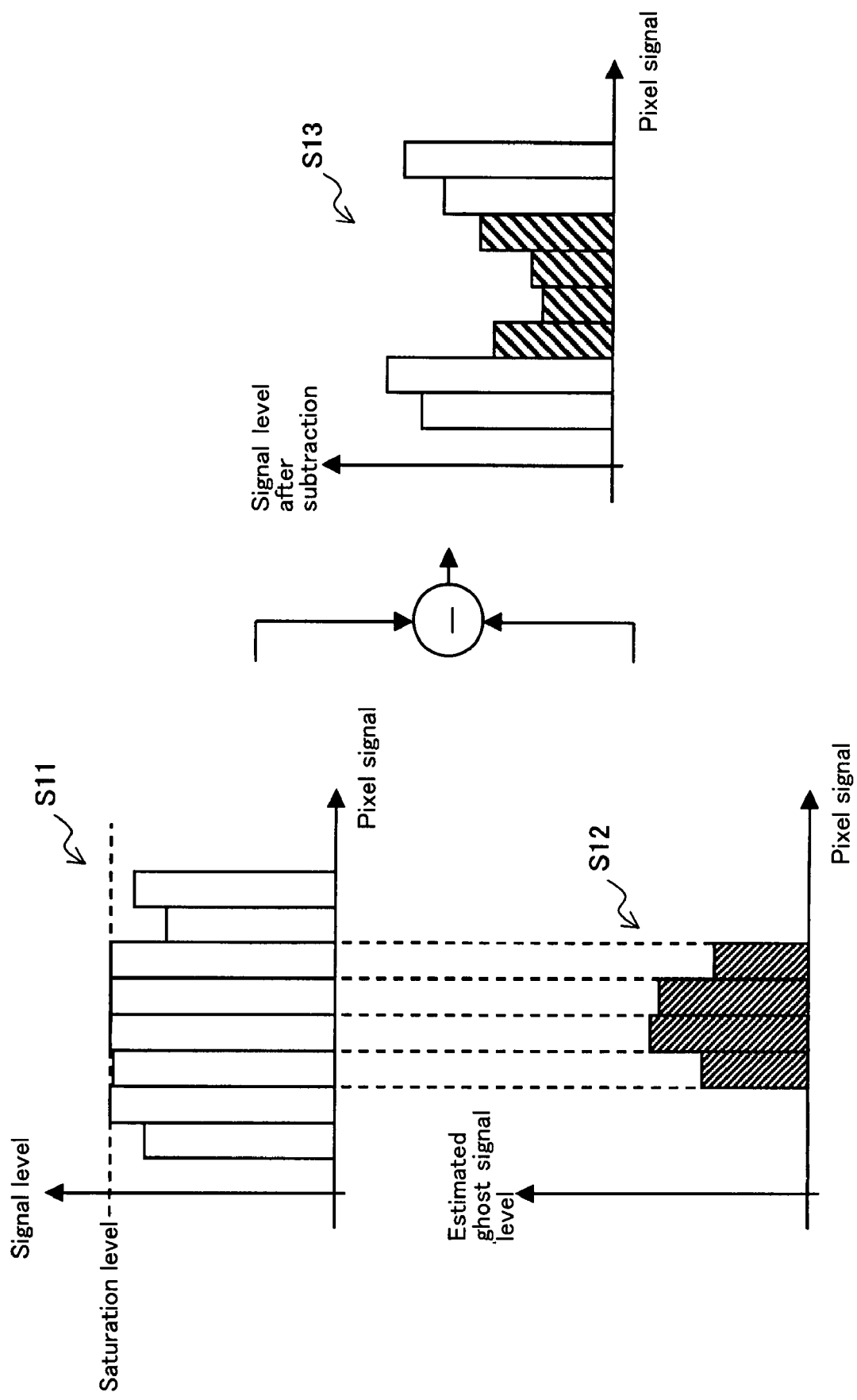

F I G. 1 3
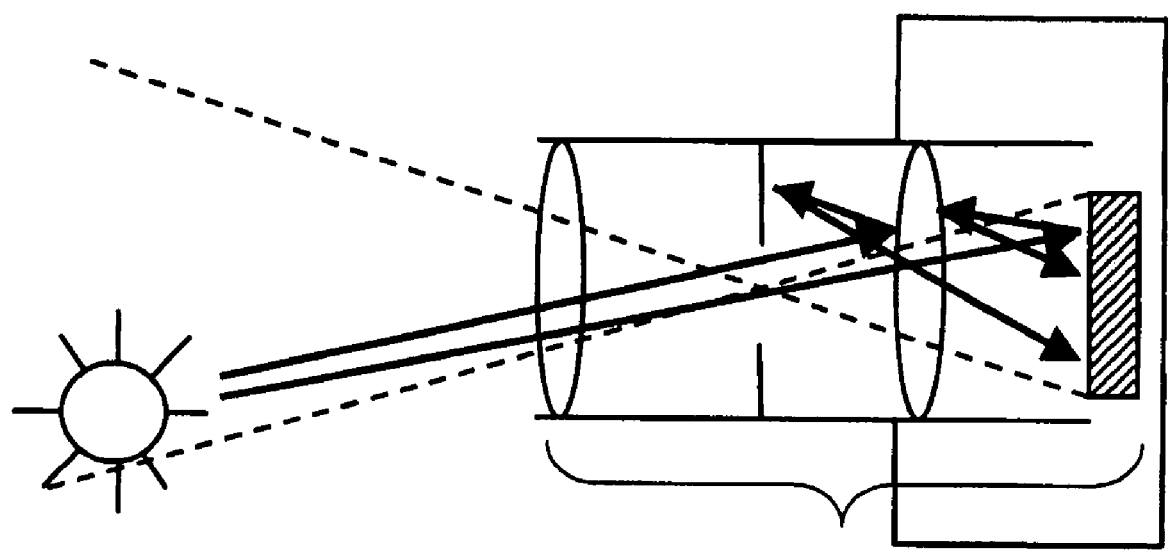

IMAGING SYSTEM

BACKGROUND OF THE INVENTION

Field of the Invention

The present invention relate to an imaging system and, in particular, to an image processing technique which corrects ghosts generated in an imaging optical system through performing digital signal processing.

In an imaging optical system, a ghost generated when light reflected from a lens barrel or an image sensor is reflected at the lens surface or a structural element (a screw, diaphragm, etc.) thereby to form an image of a diaphragm shape or structural element shape on the image sensor of a light acceptance part (see FIG. 13), when a light source having an extremely strong emission light intensity is located in the vicinity or within the photographing view angle. In particular, the ghost generated on a dark part of a subject is conspicuous, so that the image becomes extremely unbeautiful.

In order to prevent generation of such ghost, it is effective to apply antireflection coating on the lens surface. However, use of the antireflection coating is a factor for increasing the price of the camera.

As described above, it is an obstacle in terms of reduction in the size and the price to prevent the ghost generated on an imaging optical system only within the imaging optical system. Further, the image sensors using multilayer interference film filter, about which technical developments has been advanced recently, absorbs only a specific wavelength component. Thus, the reflected components are increased much more in such image sensor, so that it is more likely to generate the ghosts.

SUMMARY OF THE INVENTION

The main object of the present invention therefore is to provide an imaging system that regenerates beautiful picked up images through electrically correcting/reducing the ghosts generated due to the strong light within a subject by a simple method.

In order to solve the foregoing issues, an imaging system of the present invention comprises:
   a signal processing circuit which generates an image signal by performing signal processing on a imaging signal that is obtained through an imaging optical system that includes a lens, a diaphragm, an image sensor and a lens barrel;
   a main light source detector which detects a main light source contained in a picked up image in the image signal;
   an estimated ghost generator which generates an estimated ghost based on layout information of the main light source and the imaging optical system and structural information of the lens barrel;
   a matching device which extracts an estimated ghost image by searching the estimated ghost in the picked up image through pattern matching; and
   a ghost subtractor which subtracts the estimated ghost image from the picked up image.

In this structure, the main light source detector judges whether or not a main light source having luminance level of more than a prescribed value is contained in the picked up image. When it is contained, the main light source detector supplies the information of the detected main light source to the estimated ghost generator. The estimated ghost generator generates an estimated ghost based on the received information on the main light source. It is assumed here that the mutual relationship of the layout information of the imaging optical system, the structural information of the lens barrel and the information of the main light source is provided in advance by a simulation or the like. The estimated ghost generator generates the estimated ghost that corresponds to the information of the main light source based on the mutual relationship, and supplies it to the matching device. The matching device extracts the estimated ghost image that corresponds to the estimated ghost through performing pattern matching in the picked up image by the signal processing circuit, and supplies it to the ghost subtractor. The ghost subtractor obtains an output video signal in which the ghost component is eliminated, through subtracting the estimated ghost image from the picked up image that is supplied from the signal processing circuit. This is a way of lightening the ghost based on an electrical method. It is possible in this method to obtain an accurate subject image by a much simpler method compared to the case of applying antireflection coating on the lens surface. Further, it becomes possible to suppress generation of the ghosts effectively, even in the case where a multilayer interference filter is used for the image sensor.

In the above-described structure, there is such an embodiment that the main light source detector detects the main light source based on the information regarding luminance, a position and a color in the picked up image.

Further, in the above-described structure, there is such an embodiment that the main light source detector detects an image part that has luminance level of more than a level of luminance in accordance with an aperture value of the imaging optical system, as the main light source.

Furthermore, in the above-described structure, there is such an embodiment that the main light source detector detects an image part that has luminance level of more than a level of luminance that is determined in accordance with exposure time of the image sensor, as the main light source.

Moreover, in the above-described structure, there is such an embodiment that the estimated ghost generator generates the estimated ghost based on information regarding luminance and a position of the main light source, information regarding the diaphragm, lens layout and a structure of the lens barrel.

Further, in the above-described structure, there is such an embodiment that the estimated ghost generator further comprises a storage device for storing a shape of the generated estimated ghost. Through selecting the shape of the estimated ghost from the storage device, the estimated ghost can be generated promptly. Further, through storing various kinds of ghost shapes, it becomes possible to generate various kinds of estimated ghosts.

Furthermore, in the above-described structure, there is such an embodiment that the estimated ghost generator generates a first estimated ghost from the information regarding luminance and a position of the main light source, information regarding the diaphragm, lens layout and a structure of the lens barrel, and generates a second estimated ghost in a shape of N times as large as the first estimated ghost (N is an arbitrary real number), that is also predicted to be generated like the first estimated ghost; and
   the estimated ghost generator further comprises a storage device for storing the first estimated ghost and the second estimated ghost. In this embodiment, it is possible to respond to the ghost in the shape of N times as large as that of the generated ghost that is predicted to generate due to the lens layout.

Moreover, in the above-described structure, there is such an embodiment that the estimated ghost generator
determines a shape of the estimated ghost based on information regarding luminance and a position of the main light source;
determines a color of the estimated ghost based on information regarding a color of the main light source; and
determines luminance of the estimated ghost based on information regarding luminance of the main light source.

Further, in the above-described structure, there is such an embodiment that the estimated ghost generator sets a threshold value for luminance of the estimated ghost, and then stops generation of the estimated ghost when luminance of the estimated ghost is lower than the threshold value. This makes it possible to prioritize high-speed processing, when the possibility of a ghost generation is sufficiently low.

Furthermore, in the above-described structure, there is such an embodiment that the estimated ghost generator sets a threshold value corresponding to a size of the estimated ghost based on the information concerning luminance and a position of the main light source, and information concerning the diaphragm and lens layout, and then stops generation of the estimated ghost when a size of the estimated ghost is lower than the threshold value. This makes it possible to prioritize high-speed processing, when the influence of the ghost is sufficiently low.

Moreover, in the above-described structure, there is such an embodiment that the estimated ghost generator further comprises a zooming device for forming a similar shape of the estimated ghost. Herewith, it becomes possible to achieve a proper correction for the various kinds of ghosts even in an imaging system that only has a small memory capacity.

Further, in the above-described structure, there is such an embodiment that the matching device extracts an image whose pattern matches the estimated ghost from the picked up image, as the estimated ghost image.

Furthermore, in the above-described structure, there is such an embodiment that the matching device extracts a contour from the picked up image and the estimated ghost image respectively, and extracts a position where a difference between extracted contours becomes smallest as the estimated ghost image.

Moreover, in the above-described structure, there is such an embodiment that the matching device selectively sets data near the contour of the estimated ghost as a target of matching judgment, in calculating a difference between a contour of the picked up image and a contour of the estimated ghost image. This is that the contour of the actual subject contained in the ghost is eliminated so as to calculate the matching degree by confining to the data in the vicinity of the ghost, which is advantageous for the purpose of improving the accuracy of the matching degree.

Further, in the above-described structure, there is such an embodiment that the matching device comprises a differential filter for extracting contours from the picked up image and the estimated ghost, wherein
the differential filter is also used as a differential filter that is used for contour correction processing performed in the signal processing circuit.

Furthermore, in the above-described structure, there is such an embodiment that the matching device comprises a pattern matching engine, wherein
the pattern matching engine is used also as a motion detect engine for moving picture encoding. In a camera system provided with a moving picture recording function, a motion detect engine for finding a difference with respect to a reference image and the positional information is loaded in advance. In this embodiment, such motion detect engine can be used also as the matching device.

Moreover, in the above-described structure, there is such an embodiment that, upon detecting at least one of the estimated ghost patterns, the matching device presumes another estimated ghost image that is generated simultaneously, based on a result of a simulation performed in advance. Herewith, the speed of the processing can be improved.

Further, in the above-described structure, there is such an embodiment that the ghost subtractor subtract the estimated ghost image, that is judged by the matching device to accord with the estimated ghost in the picked up image s, from the picked up image. This means that it is not always necessary to generate an estimated ghost image if the position of the ghost generation is grasped (managed) on the video.

Furthermore, in the above-described structure, there is such an embodiment that the ghost subtractor stops subtraction processing of the estimated ghost image for a saturated part within the picked up image. When the input signal is saturated, the signal level of the pixel where the ghost is generated becomes lower than that of the peripheral pixels through performing the subtraction processing. Thus, the ghost is not eliminated by the subtraction. Rather, a dark ghost with a low signal level is generated. In this embodiment, it is possible to avoid such inconvenience through terminating subtraction processing in the saturated part.

According to the present invention, it is possible to eliminate the ghost at a high speed with a much simpler structure, compared to the case of applying antireflection coating to the lens surface. Thus, a beautiful picked up image can be obtained. Further, generation of the ghosts can be suppressed effectively even in the case where a multilayer interference film filter is used for the image sensor.

The imaging system of the present invention can be effectively used as a still camera, a movie camera or the like, which is capable of eliminating the ghost at a high speed with a simple structure and capable of obtaining a beautiful filming image.

BRIEF DESCRIPTION OF THE DRAWINGS

Other objects of the present invention will become clear from understanding of the preferred embodiments described later and it will be clearly specified in the appended claims. Those skilled in the art will appreciate that there are many other advantages of the present invention by embodying the present invention.

FIG. 7 is a block diagram showing the structure of a signal processing circuit of an imaging system according to a third embodiment of the present invention;

FIG. 12 is an illustration for a problem generated in subtraction processing when an imaging system according to a sixth embodiment of the present invention is saturated; and FIG. 13 is an illustration for the principle of generating a ghost.

DETAILED DESCRIPTION OF THE INVENTION

Hereinafter, embodiments of the imaging system according to the present invention will be described in detail referring to the accompanying drawings.

First Embodiment

Figure 1:
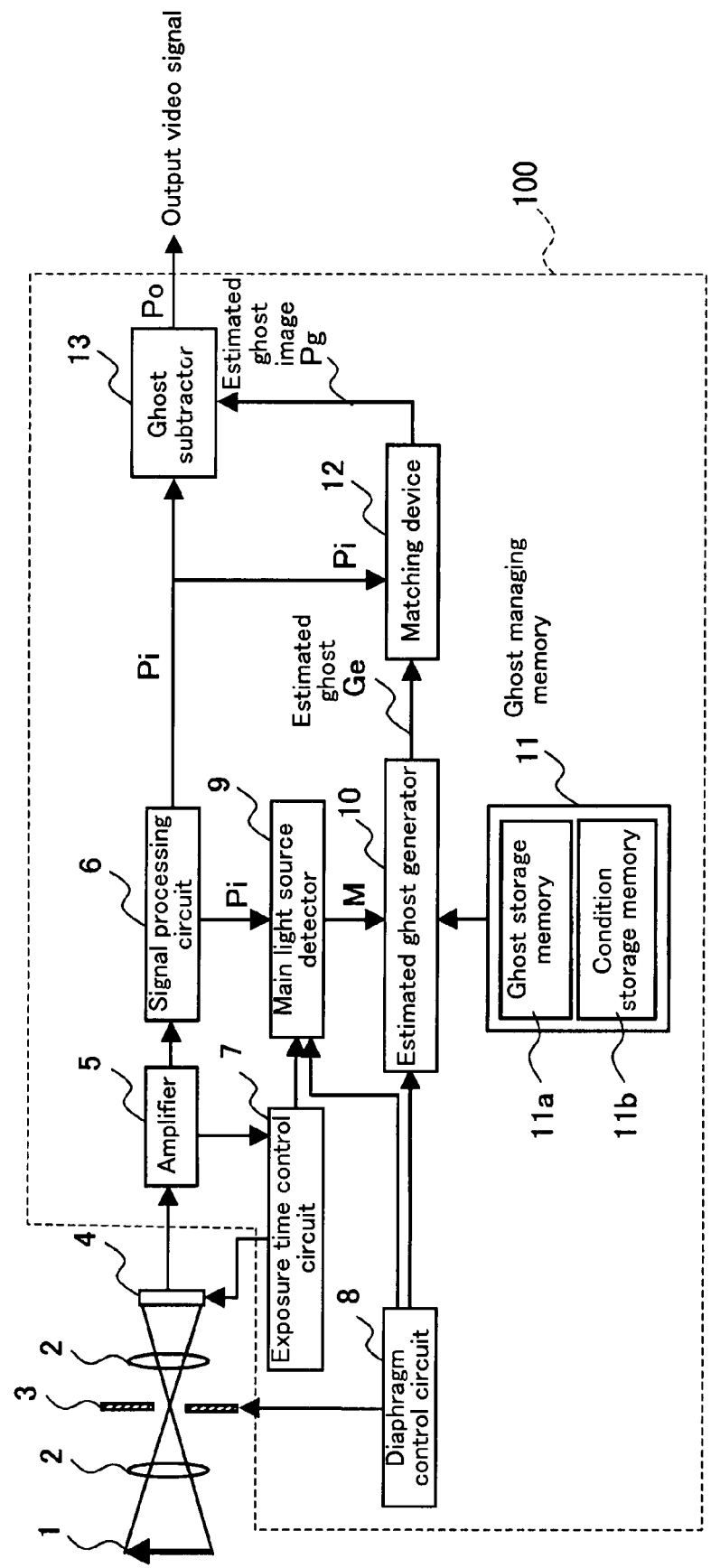
FIG. 1 is a block diagram showing the structure of an imaging system according to a first embodiment of the present invention.

FIG. 1 is a block diagram showing the structure of a digital camera that includes an imaging system 100 according to a first embodiment of the present invention. In FIG. 1, reference numeral 1 is a subject, 2 is a lens, 3 is a diaphragm, 4 is an image sensor, 5 is an amplifier for amplifying image signals form the image sensor 4, 6 is a signal processing circuit for performing prescribed signal processing to the image signals from the amplifier 5, 7 is an exposure time control circuit for controlling the exposure time of the image sensor 4, 8 is a diaphragm control circuit for controlling the aperture value of the diaphragm 3, 9 is a main light source detector, 10 is an estimated ghost generator, 11 is a ghost managing memory, 12 is a matching device, and 13 is a ghost subtractor. The lens 2 and the diaphragm 3 constitute an imaging optical system. The amplifier 5, the signal processing circuit 6, the exposure time control circuit 7, the diaphragm control circuit 8, the main light source detector 9, the estimated ghost generator 10, the ghost managing memory 11, the matching device 12 and the ghost subtractor 13 constitute the imaging system 100.

The main light source detector 9 detects a main light source M that is the strong light source accounting for the ghost that exceeds a luminance level as detection standard from a picked up image Pi, using a picked up image Pi from the signal processing circuit 6. At the same time, the main light source detector 9 obtains the information regarding the luminance, position and color of the main light source M, and outputs it as the information of the main light source M.

The estimated ghost generator 10 searches a matching condition within a condition storage memory 11b of the ghost managing memory 11 based on the information regarding the luminance and position of the main light source M supplied from the main light source detector 9, and extracts the shape of the estimated ghost Ge that corresponds to the searched condition from a ghost storage memory 11a.

The ghost managing memory 11 stores the shapes of the estimated ghosts Ge, that are generated for prescribed light sources in accordance with the diaphragm, lens layout, and the structural information of a lens barrel, to the ghost storage memory 11a. At the same time, ghost manage memory 11 relates the conditions (aperture value, exposure time) of the imaging optical system to the light source information (position, luminance, color), and stores it to the condition storage memory 11b.

The matching device 12 searches the ghost that matches the estimated ghost Ge that is generated in the estimated ghost generator 10 based on the picked up image Pi from the signal processing circuit 6, through pattern matching.

The ghost subtractor 13 subtracts an estimated ghost image Pg obtained by the matching device 12 from the picked up image Pi that is transmitted from the signal processing circuit 6, and outputs an output video signal Po in which the ghost is corrected/lightened.

Through a simulation performed in advance, the shapes of the estimated ghosts Ge, that are generated in accordance with the diaphragm, lens layout, and the structural information of the lens barrel for prescribed light sources, are calculated. The calculated shapes of the estimated ghosts Ge are stored in the ghost storage memory 11a within the ghost managing memory 11. At the same time, after relating the estimated ghosts Ge to the condition (aperture value, exposure time) of the imaging optical system and the light source information (position, luminance, color) and it is stored to the condition storage memory 11b.

The light from the subject 1 forms an image on a photoelectrical conversion face of the image sensor 4 through the lens 2 and the diaphragm 3. The image signal outputted from the image sensor 4 is amplified in the amplifier 5 and thereafter inputted to the signal processing circuit 6. The exposure time control circuit 7 and the diaphragm control circuit 8 perform the following controls in accordance with the output of the amplifier 5 so as to obtain a proper level output from the amplifier. That is, the exposure time control circuit 7 controls the exposure time of the image sensor 4, and the diaphragm control circuit 8 controls the diaphragm 3. Herewith, a proper exposure state can be obtained. The signal control circuit 6 performs adjustment of the white balance and the contrast, and contour correction, etc. to the image signal, and outputs it as the picked up image Pi to the main light source detector 9, the matching device 12, and the ghost subtractor 13.

The exposure time control circuit 7 supplies the exposure time set in the image sensor 4 to the main light source detector 9. In addition, the diaphragm control circuit 8 supplied the aperture value set in the diaphragm 3 to the main light source detector 9. The main light source detector 9 changes the luminance level as a detection criterion appropriately in accordance with the received exposure time and the aperture value. This is the adjustment performed based on a reason because: the amount of light received by the image sensor 4 changes depending on the exposure time; the amount of light entered to the imaging optical system changes depending on the aperture value; and the exposure level of the input image changes due to the two factors.

The main light source detector 9 detects the main light source M by using the picked up image Pi that is supplied from the signal processing circuit 6. The main light source M is detected from the picked up image Pi as the strong light source that exceeds the luminance level as the detection standard. Such strong light source is a cause for generating a ghost. Upon detecting the main light source M, the main light source detector 9 obtains the information on the luminance, position, and color of the detected main light source M, and outputs it to the estimated ghost generator 10 as the information of the main light source M.

The estimated ghost generator 10 obtains the lens layout information and the aperture value from the diaphragm control circuit 8 at the time of photographing. Further, the estimated ghost generator 10 searches a matching condition from a group of conditions stored in the condition storage memory 11a based on the information regarding the luminance and position of the main light source M supplied from the main light source detector 9, and extracts the shape of the estimated ghost Ge that corresponds to the condition extracted through the search from the recorded contents (a group of the shapes of the ghosts Ge) of the ghost storage memory 11a. Further, the estimated ghost generator 10 determines the color of the estimated ghost Ge based on the color information of the main light source M, and determines the luminance of the estimated ghost Ge based on the luminance information. The estimated ghost generator 10 does not generate a ghost when the luminance of the estimated ghost Ge becomes less than a prescribed value and when the size of the estimated ghost Ge estimated from the information regarding the luminance and position of the main light source M and the information on the diaphragm and the lens layout becomes less than a prescribed value.

The estimated ghost Ge, that the estimated ghost generator 10 generates based on the information of the main light source M supplied from the main light source detector 9 and the simulation information stored in the ghost managing memory 11, is outputted to the matching device 12 of a next stage.

The picked up image Pi and the estimated ghost Ge are inputted to the matching device 12. The matching device 12 searches a ghost G that matches the estimated ghost Ge from the actual picked up image Pi through performing pattern matching of the picked up image Pi and the estimated ghost Ge. Then, the matching device 12 outputs the searched ghost G to the ghost subtractor 13 as an estimated ghost image Pg. The ghost subtractor 13 subtracts the estimated ghost image Pg from the picked up image Pi that is supplied from the signal processing circuit 6. By doing this, obtained is an output video signal Po (the ghost is corrected/lightened) in which the actual ghost component contained in the picked up image Pi is selectively eliminated.

Furthermore, it is not need to generate a subtraction image such as the estimated ghost image Pg. It is also possible to be constituted so as to subtract the ghost from the actual picked up image Pi through address management.

Next, the principle of ghost correction executed in the ghost subtractor 13 will be described referring to FIG. 2. It is assumed in the explanations below that the picked up image Pi contains ghosts G1 and G2. These are the ghosts generated by the diaphragm 3 due to the main light source M such as the sun. The estimated ghost image Pg is the image used for subtraction, that is generated based on estimated ghosts Ge1 and Ge2 that are searched from the picked up image Pi by the matching device 12. Only the components of the ghosts G1 and G2 are eliminated by subtracting the estimated ghost image Pg from the picked up image Pi by a subtractor 13a within the ghost subtractor 13. Herewith, the output video signal Po in which the ghosts are corrected and lightened can be obtained.

Figure 3:
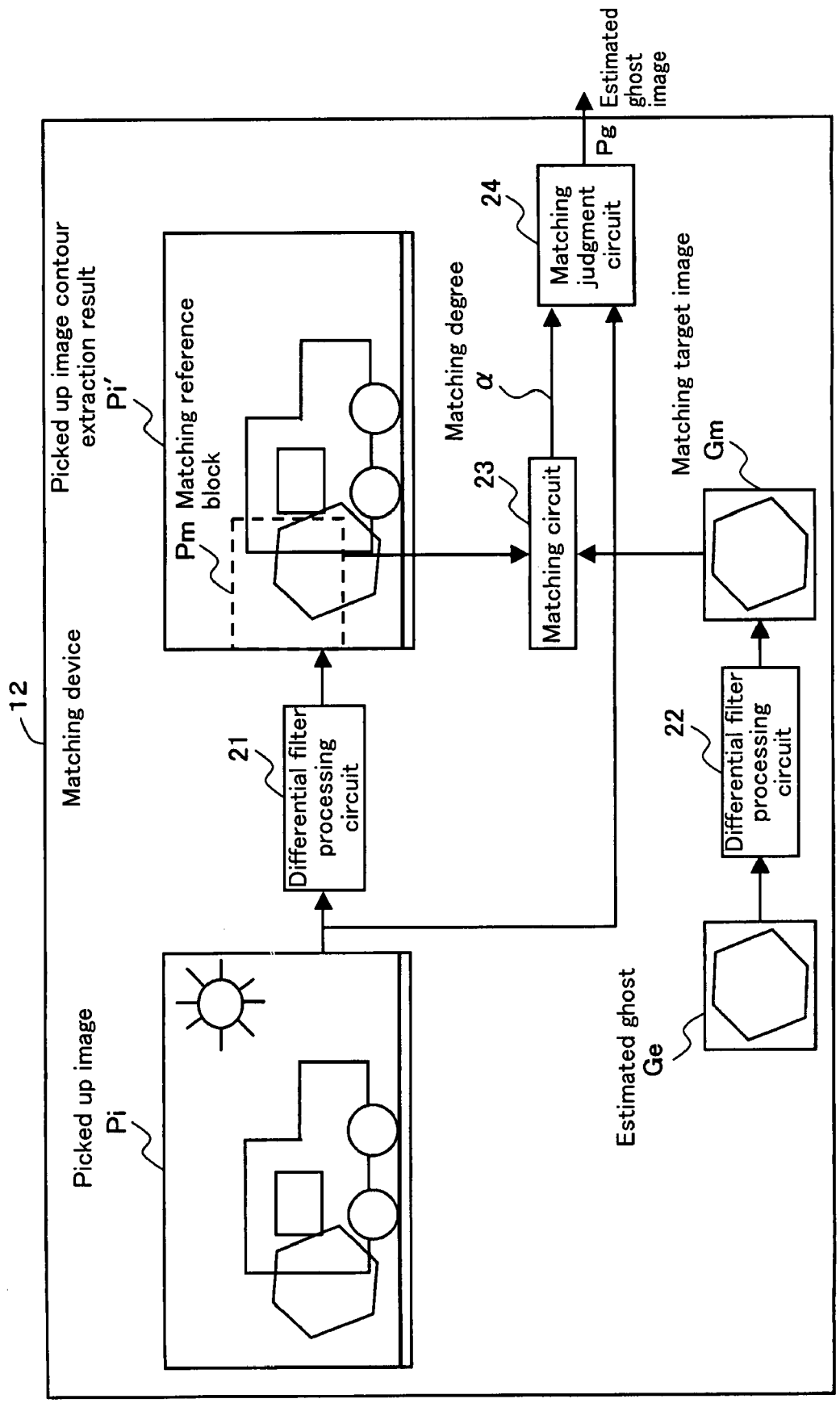
FIG. 3 is a block diagram showing a specific structure of a matching device according to the first embodiment of the present invention.

Next, a specific structure of the matching device 12 will be described referring to FIG. 3 and FIG. 4. FIG. 3 is a block diagram showing the specific structure of the matching device 12. In FIG. 3, reference numeral 21 is a differential filter processing circuit, 22 is a differential filter processing circuit, 23 is a matching circuit, and 24 is a matching judgment circuit.

The differential filter processing circuit 21 extracts the contour from the picked up image Pi that is supplied from the signal processing circuit 6 to generate a picked up image contour extraction result Pi'. The differential filter processing circuit 22 extracts the contour of the estimated ghost Ge that is supplied from the estimated ghost generator 10 to generate a matching target image Gm. The matching circuit 23 calculates a matching degree α of the estimated ghost Ge to the actual ghost G that is generated in the picked up image Pi in a subtraction result that is obtained by subtracting the matching target image Gm from a matching reference block Pm within the picked up image contour extraction result Pi'. The matching judgment circuit 24 searches the ghost G that matches the estimated ghost Ge within the picked up image Pi based on the matching degree a. When the ghost G is found as a result of the search, the matching judgment circuit 24 generates the estimated ghost image Pg and outputs it to the ghost subtractor 13.

Figure 4:
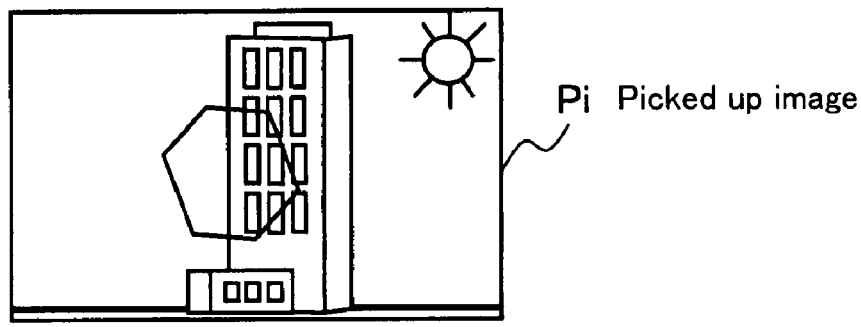
FIG. 4 is a block diagram showing a specific structure of the matching device according to the first embodiment of the present invention.
Figure 4:
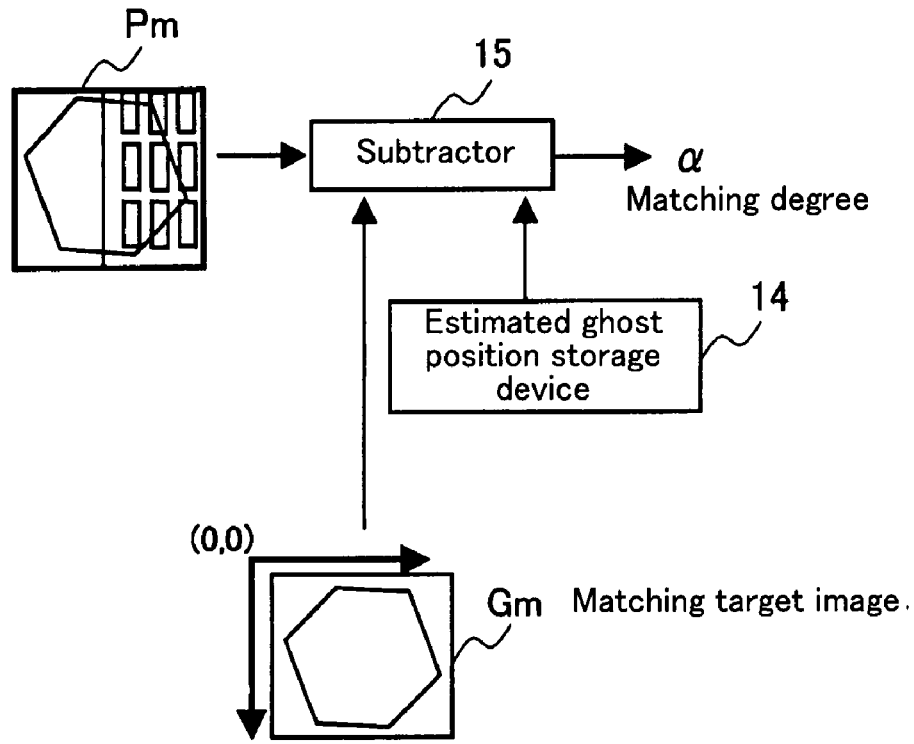

FIG. 4 is a block diagram showing a specific structure of the matching circuit 23. In FIG. 4, reference numeral 14 is an estimated ghost position storage device, and 15 is a subtractor. The estimated ghost position storage device 14 stores the coordinates of the matching target image Gm that is generated from the estimated ghost Ge by the differential filter processing circuit 22. The subtractor 15 calculates the matching degree a of the estimated ghost Ge to the actual ghost G by subtracting the matching target image Gm from the matching reference block Pm. At that time, the subtractor 15 calculates the matching degree a by performing the subtraction processing only when the actual ghost G corresponds to the coordinates of the matching target image Gm that is supplied form the estimated ghost position storage device 14.

Next, the operation of the matching device 12 structured in the manner mentioned above will be described. The matching device 12 receives the input of the picked up image Pi from the signal processing circuit 6 and the estimated ghost Ge from the estimated ghost generator 10. The matching device 12 searches the ghost that matches the estimated ghost Ge in the picked up image Pi through pattern matching. That is, the differential filter processing circuit 21 generates the picked up image contour extraction result Pi' through contour extraction. The picked up image contour extraction result Pi' is transmitted to the matching circuit 23 by a unit of the matching reference block Pm. Similarly, the differential filter processing circuit 22 generates the matching target image Gm from the estimated ghost Ge through contour extraction. The matching target image is managed with the coordinates having (0, 0) at the upper left as the origin, and the coordinates of the matching target image Gm are stored in the estimated ghost position storage device 14. The estimated ghost position storage device 14 supplies the coordinates of the matching target image Gm to the subtractor 15. The subtractor 15 subtracts the matching target image Gm from the matching reference block Pm of the picked up image contour extraction result Pi' to calculate the matching degree a of the estimated ghost Ge to the actual ghost G, based on a condition for subtraction that the actual ghost G corresponds to the coordinates of the matching target image Gm. The calculated matching degree a is outputted to the matching judgment circuit 24.

The subtractor 15 calculates the matching degree a by shifting the matching reference block Pm within the picked up image contour extraction result Pi' so as to cover all the pixels, for example, as from the upper left to the lower right. The matching judgment circuit 24, upon receiving a supply of the matching degree a, judges the matching reference block Pm having the smallest value of the matching degree a as the matching reference block Pm that matches the estimated ghost Ge.

Figure 5:
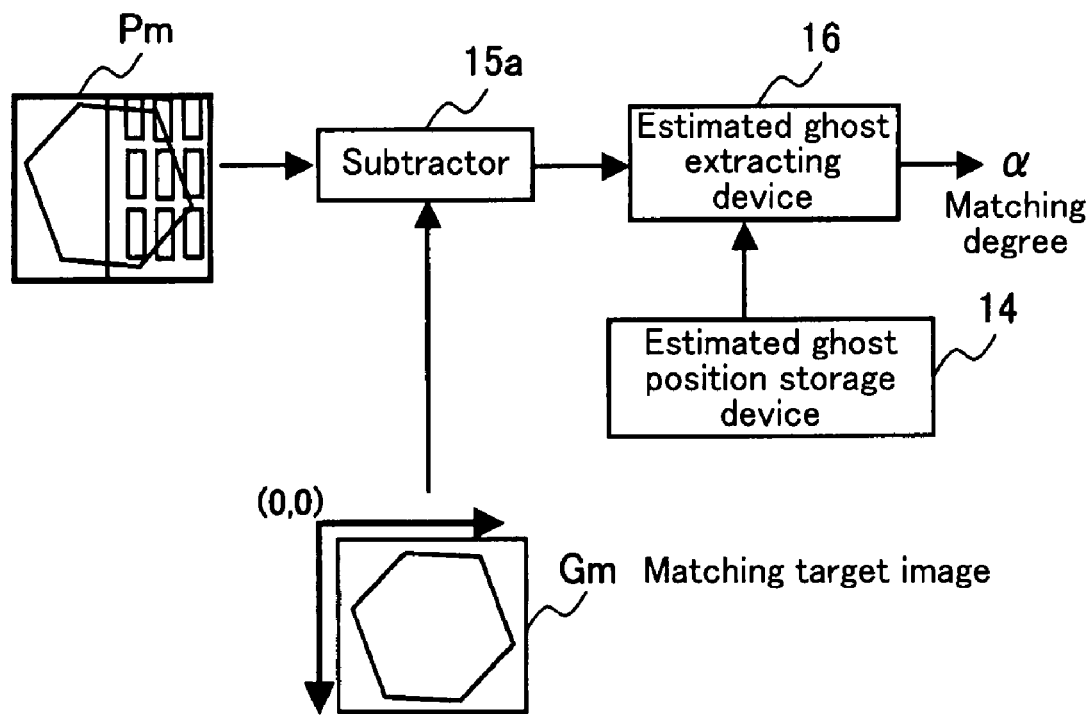
FIG. 5 is a block diagram showing another specific structure of the matching device according to the first embodiment of the present invention.

FIG. 5 shows another structural example of the matching circuit 23. Reference numeral 15a is a subtractor for subtracting the matching target image Gm from the matching reference block Pm, and 16 is an estimated ghost extracting device. The subtractor 15a supplies a subtraction result that is obtained by subtracting the matching target image Gm from the matching reference block Pm of the picked up image contour extraction result Pi', to the estimated ghost extracting device 16. The subtraction result obtained by the subtractor 15a also contains the contour information of the subject other than that of the ghost, unlike the case of FIG. 4. The estimated ghost extracting device 16 selectively extracts a prescribed subtraction result from the subtraction results of the subtractor 15a to calculate the matching degree a of the estimated ghost Ge to the actual ghost G that is generated in the picked up image Pi, based on a condition for extraction that the actual ghost G corresponds to the coordinates of the matching target image Gm that is supplied from the estimated ghost position storage device 14. The calculated matching degree α is outputted to the matching judgment circuit 24.

In such structure of the matching circuit 23, the contour of the actual subject other than the ghost is also extracted within the ghost G in the picked up image contour extraction result Pi'. Thus, if the picked up image contour extraction result Pi' is used as it is, it is possible to misjudge the ghost. Therefore, the matching circuit 23 judges the matching degree a only for the data in the vicinity of the estimated ghost Ge. That is, the matching target images are managed with the coordinates, and the matching degree a is calculated from a difference between the matching reference block Pm and the matching target image Gm only when the actual ghost G matches the coordinates of the matching target image Gm. As a result, it becomes possible to calculate the matching degree a focused only on the ghost by excluding the contour of the actual picked up image Pi.

When the matching judgment circuit 24 finds the ghost G that matches the estimated ghost Ge based on the matching degree a within the picked up image Pi, the matching judgment circuit 24 generates the estimated ghost image Pg and outputs it to the ghost subtractor 13.

Second Embodiment

The ghost is generated when the light reflected by the structural element of the lens barrel such as the screw or the diaphragm forms an image on the image sensor. Therefore, it is expected to generate a similar-shaped ghost in a size of N times as large as the shape of the generated ghost, depending on the lens layout (N is an arbitrary real number). And so, the estimated ghost generator 10 generates the shape and color of the estimated ghost Ge in advance based on the information on the luminance and position of the main light source M, and the structural information such as the diaphragm, the lens layout, the lens barrel and the like. Further, the estimated ghost generator 10 also stores the information of the estimated ghost in a similar shape of N times to the ghost managing memory 11. Herewith, it also becomes possible to correct the ghost in a similar-shape of N times. It is assumed that the possible range of the real number N is calculated in advance through a simulation.

Figure 6:
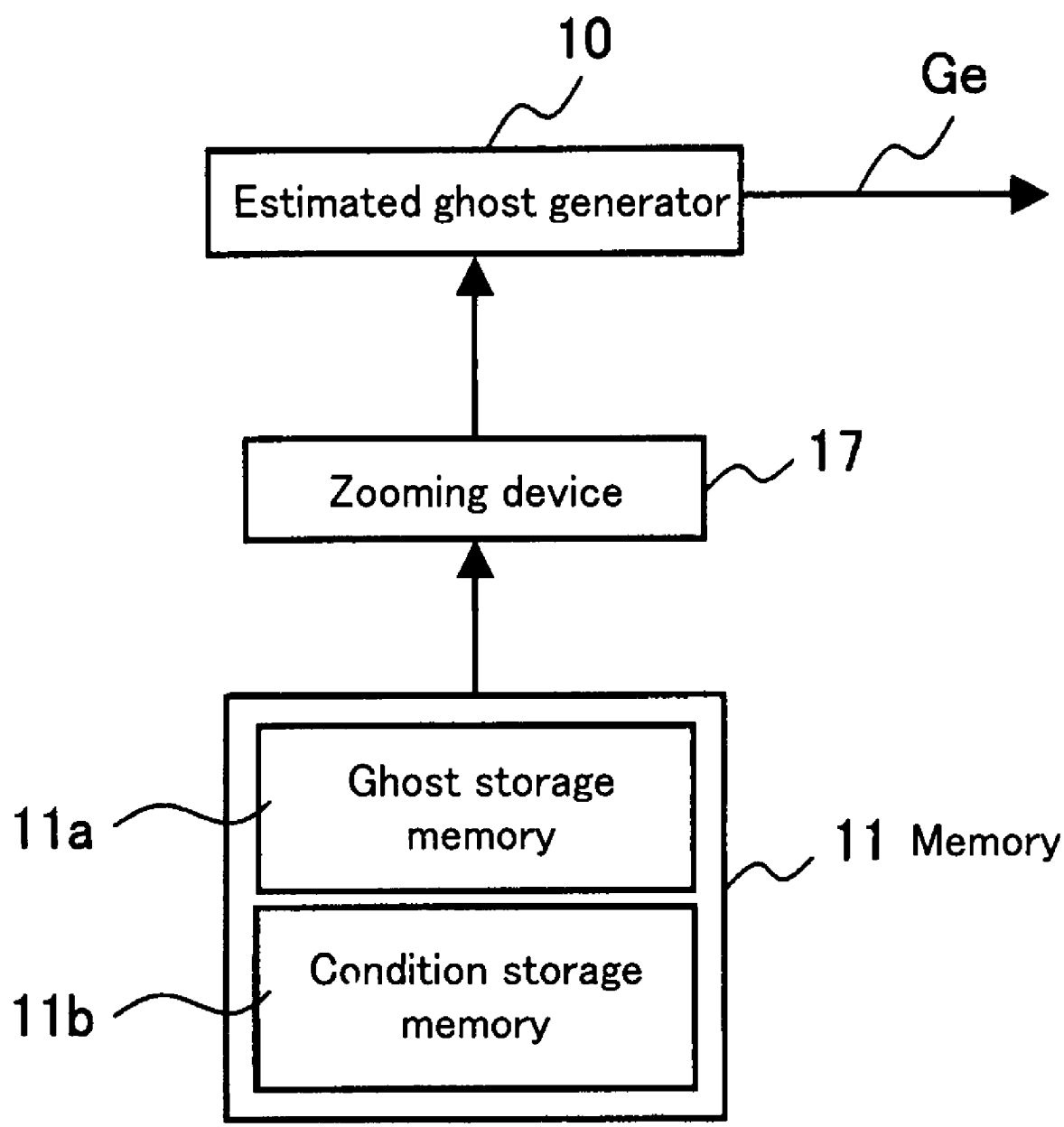
FIG. 6 is a block diagram showing the structure of a zooming device of an imaging system according to a second embodiment of the present invention.

As described above, for storing the information regarding the shapes of the ghosts in a size of N times that will possible to be generated, it is necessary to have a memory with a large capacity. When the imaging system does not or cannot mount a large-capacity memory, it is constituted in the manner as shown in FIG. 6. In FIG. 6, the envisioned minimum ghost shape is stored in advance to the ghost managing memory 11, and a similar-shaped ghost with N times of magnitude is generated through providing a zooming device 17 therein. The estimated ghost generator 10 selects and reads out the ghost shape that is similar to the ghost assumed to be generated among the estimated ghosts stored in the ghost managing memory 11, based on the condition of the imaging optical system and the light source information. Further, a shape with N times of magnitude is generated with the zooming device 17 and it is outputted as the estimated ghost Ge. It is assumed that calculation has been performed in advance through a simulation with respect to the relationship between the condition of the imaging optical system, the light source information and the zoom magnification. By employing the embodiment shown in FIG. 6, it is possible to achieve ghost correction even in an imaging system that has a small memory capacity.

Third Embodiment

In general, the signal processing circuit 6 of the imaging system has the structure shown in FIG. 7. That is, the signal processing circuit 6 comprises: an AWB circuit 31 that corrects the balance of the colors for a white subject based on the color temperature of the light source; a γ correction circuit 32 which linearly displays the subject by multiplying the reciprocal of the display property of a television or the like in accordance with the light quantity; luminance signal generating circuit 33; a contour enhancement processing circuit 34 which adds a high-frequency components together after generation of luminance signal so as to bring the image into view as having high resolution; an adder 35; a color separation circuit 36; a matrix processing circuit 37 which adjusts the spectral property of the sensor and the hue balance that becomes unbalanced due to the signal processing; and the like.

Figure 8:
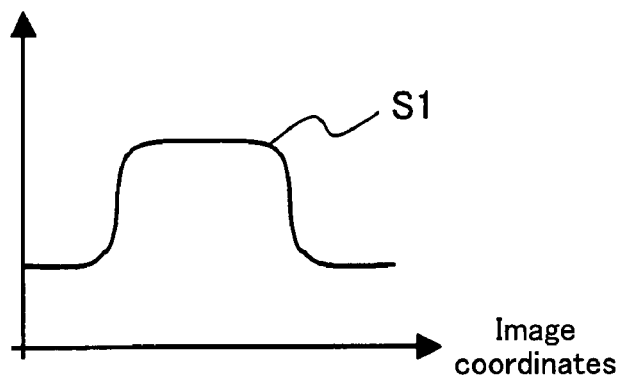
FIG. 8 is an illustration for contour emphasis processing according to the third embodiment of the present invention.
Figure 8:
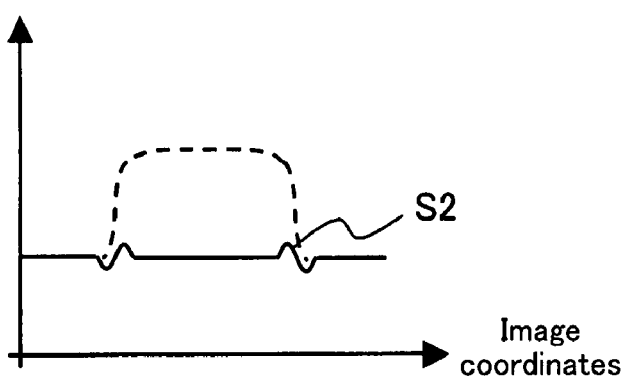
Figure 8:
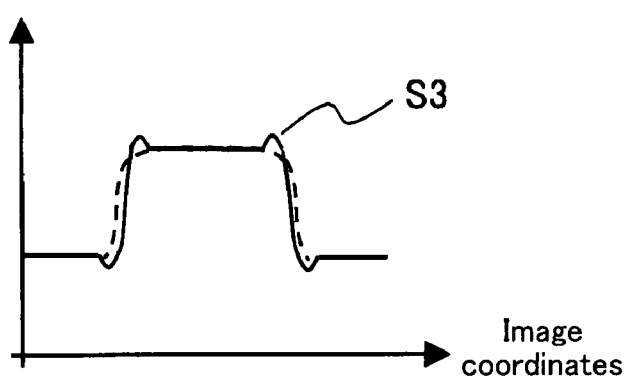

Here, the operation of the contour enhancement processing circuit 34 will be described referring to FIG. 8. When an image signal inputted to the imaging system passes through the lens or an optical lowpass filter, the high-frequency component thereof becomes weakened. It is the contour enhancement processing to restore the resolution by boosting the weakened high-resolution component of the inputted image signal up to the original signal. As an example of such processing, description is given of the case where a signal S1 with a weakened high-frequency component is inputted. In this case, a differential filter is applied to the signal S1 to generate a signal S2 in which only the high-frequency component of the input signal, that is, the contour of the input signal, is extracted. Then, the signal S2 is added to the signal S1 to boost up the weakened high-frequency component. Herewith, it is possible to generate a signal S3 in which the contour is enhanced.

Figure 9:
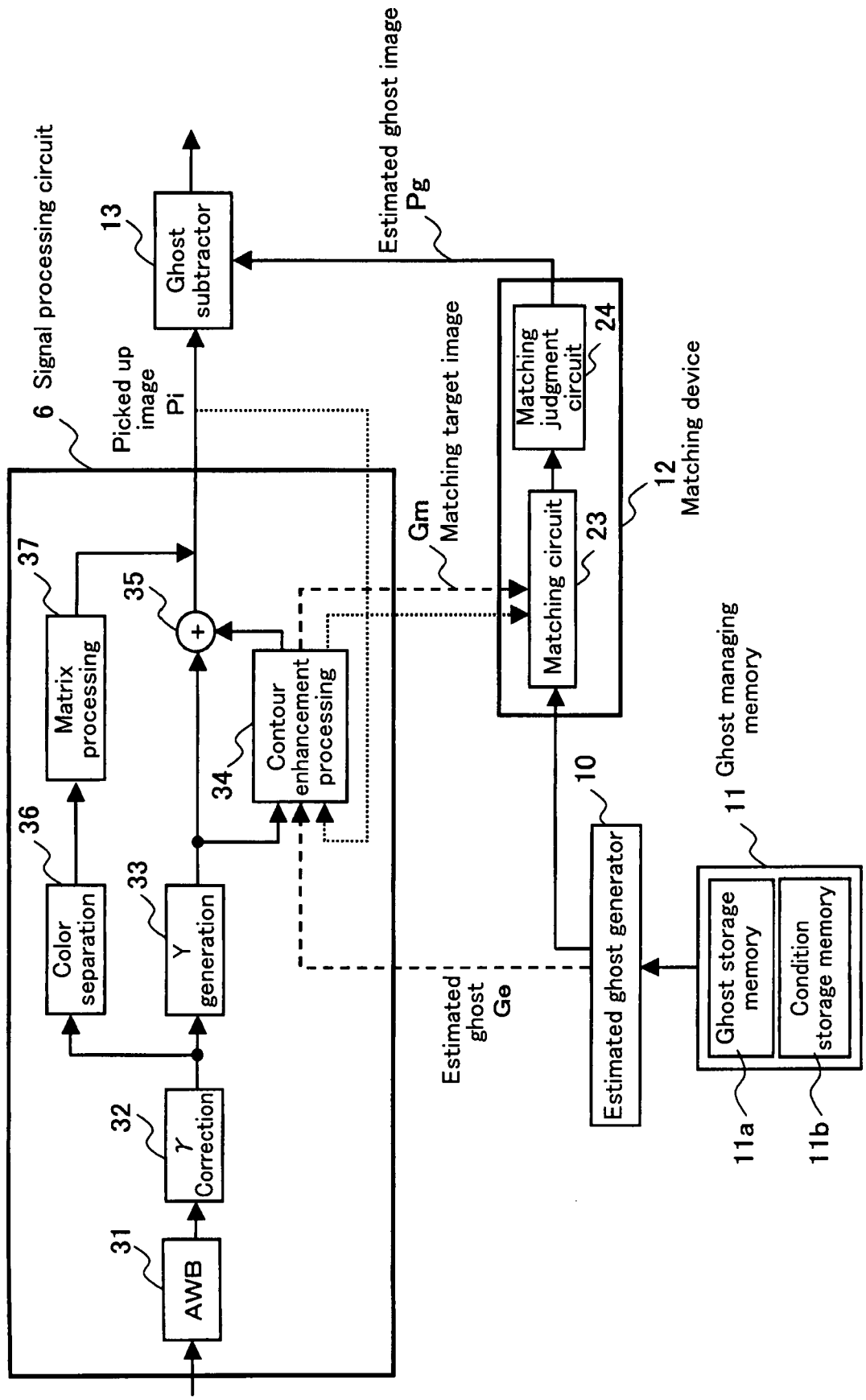
FIG. 9 is a block diagram showing the structure of an imaging system according to the third embodiment of the present invention, when a differential filter is used in common.

By utilizing this principle, it is possible to use the differential filter within the contour enhancement processing circuit 34 also as the differential filter processing circuit 21 of FIG. 3. FIG. 9 shows the circuit block diagram when the differential filter processing circuit is used for dual purpose.

The estimated ghost generator 10 reads out the estimated ghost Ge from the ghost managing memory 11, and supplies it to the contour enhancement processing circuit 34. The contour enhancement processing circuit 34 outputs the matching target image Gm obtained by extracting the contour from the estimated ghost Ge, to the matching device 12. The picked up image Pi outputted from the signal processing circuit 6 is also supplied to the contour enhancement processing circuit 34. The contour enhancement processing circuit 34 also extracts the contour information of the picked up image Pi, and outputs it to the matching device 12. The matching device 12 generates an estimated ghost image Pg through the pattern matching as described in the first embodiment, and supplies it to the ghost subtractor 13. The ghost subtractor 13 subtracts the estimated ghost image Pg from the actual picked up image Pi to generate an output video signal Po.

It is often the case that the contour enhancement processing circuit 34 has a plurality of filter properties depending on the photographing mode and the like. Further, the signals are amplified within the amplifier 5 under a state where the level of the analog gain therein is increased, at a low luminance in the light quantity control of the imaging system. As a result, the noise component becomes amplified as well. When the signal amplified in this manner is signal-processed by the contour enhancement processing circuit 34, the noise component becomes enhanced as well. Therefore, the filter property may also be changed depending on the level of the analog gain. Through using the differential filter processing circuit 21 also as the differential filter within the contour enhancement processing circuit 34, the following advantages can be obtained. That is, it becomes possible to select the differential filter property to be used for extracting the contour from the picked up image Pi based on the lens information, the subject information and the main light source information that is obtained from the main light source detector 9. Further, the shape of the ghost differs depending on the number of lenses constituting the imaging system. In that case, it is possible to select the filter that has the optimum property among a plurality of differential filter properties depending on the camera system.

Fourth Embodiment

Figure 10:
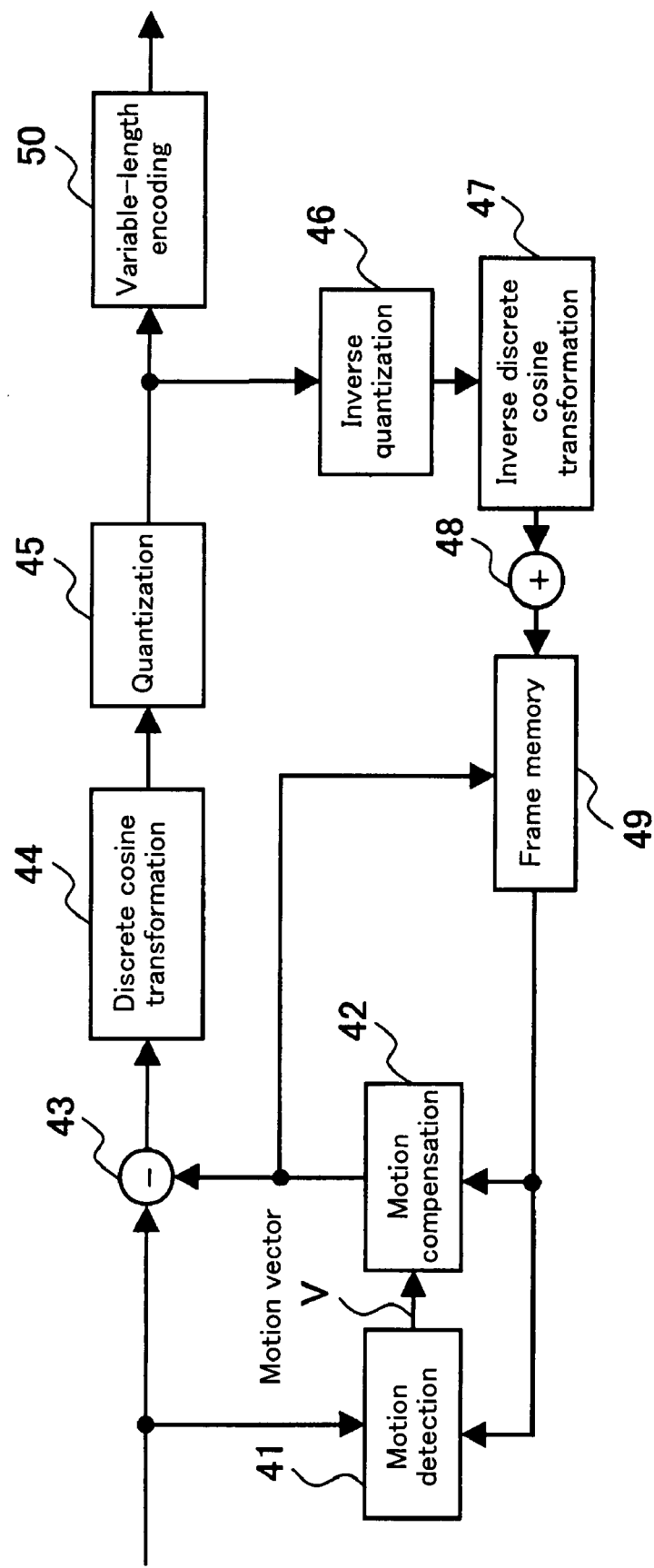
FIG. 10 is a block diagram showing the constitution of MPEG video encoding processing according to a fourth embodiment of the present invention.

In a system of a still camera or a movie camera where an MPEG-type moving picture recording function is loaded, MPEG video encoding processing shown in FIG. 10 is executed. Referring to FIG. 10, a motion detect engine 41 searches a position, where a difference with respect to a reference image becomes smaller, as a unit of macro-block, and the obtained positional information (motion vector) and the difference value are encoded. The processing of the motion detect engine 41 will be described herein referring to FIG. 11.

A candidate block B1 within a reference frame F1 is compared with an encoding target macro-block B2 within an encoding target frame F2 by a macro-block unit, and the sum D of differences of each pixel within the block is calculated through a block matching method expressed with a following expression (1). The difference between the position of the candidate block B1 within the reference frame F1 and the position of the encoding target macro-block B2, at the time when the sum D of the differences becomes the minimum, becomes the motion vector V.

$$D = \Sigma |Pi - Ri| \quad (1)$$

Figure 11:
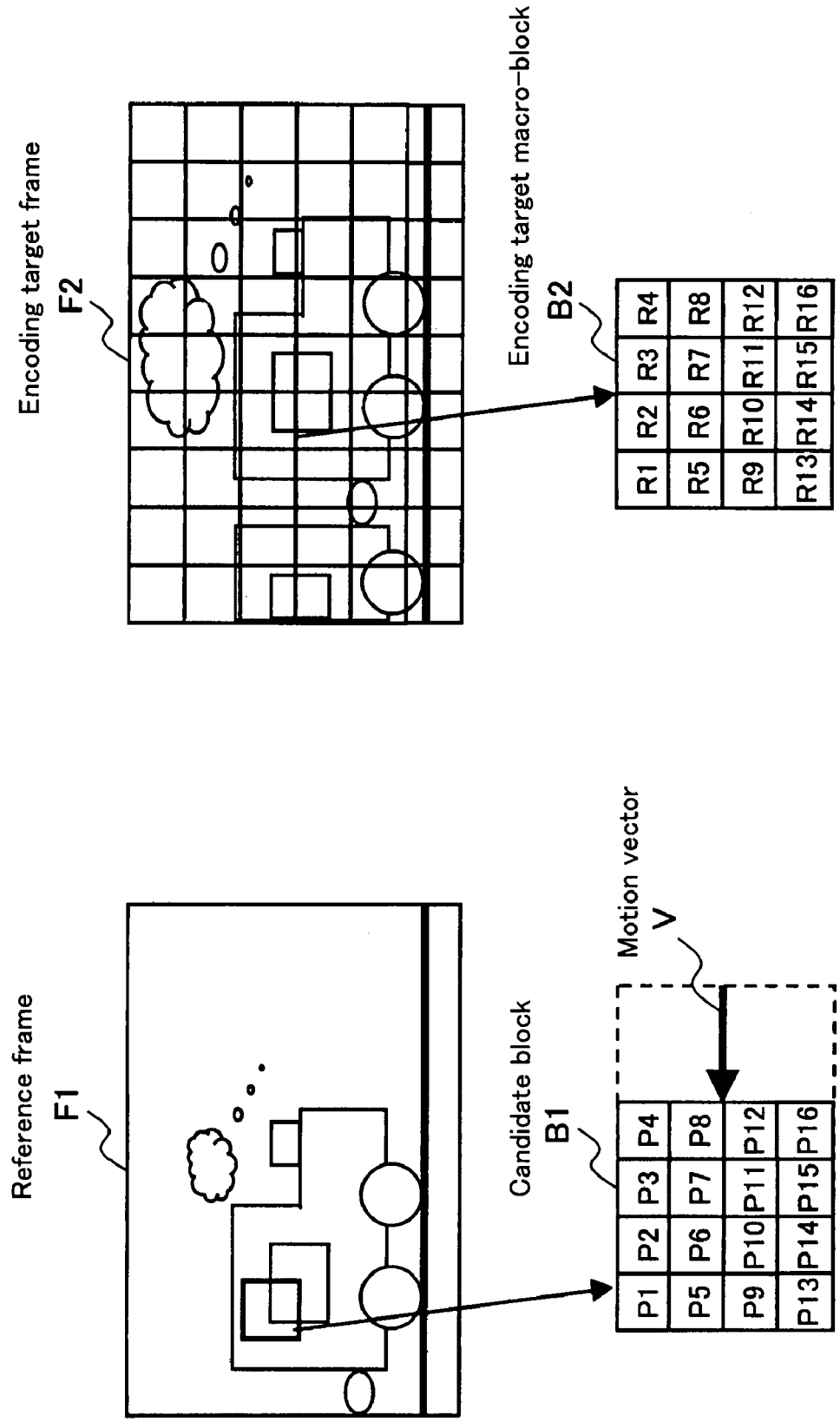
FIG. 11 is an illustration for the processing executed in a motion detect engine according to the fourth embodiment of the present invention.

Here, "i" is the number of pixels within the macro-block. In FIG. 11, the block is illustrated as having 4×4 pixels. However, in practice, the processing is executed based on a unit of 16×16 pixels in MPEG 2.

As just described, the motion detect engine 41, which calculates the differences with respect to the reference image and the positional information thereof, is loaded in advance to the camera system that has the moving picture recording function. Therefore, it is possible to use the motion detect engine 41 also as the matching device 12. When the motion detect engine 41 is used as the matching device 12, the picked up image Pi as a substitute for the encoding target frame F2 and the matching target image Gm of the estimated ghost Ge as a substitute for the candidate block B1 of the reference frame F1 are compared with the motion detect engine 41. As a result, it is possible to calculate the position where the sum of the differences of each pixel within the block becomes the minimum, that is, the position of the ghost that matches the estimated ghost. Thus, the ghost can be subtracted and corrected from the picked up image.

Fifth Embodiment

Figure 2:
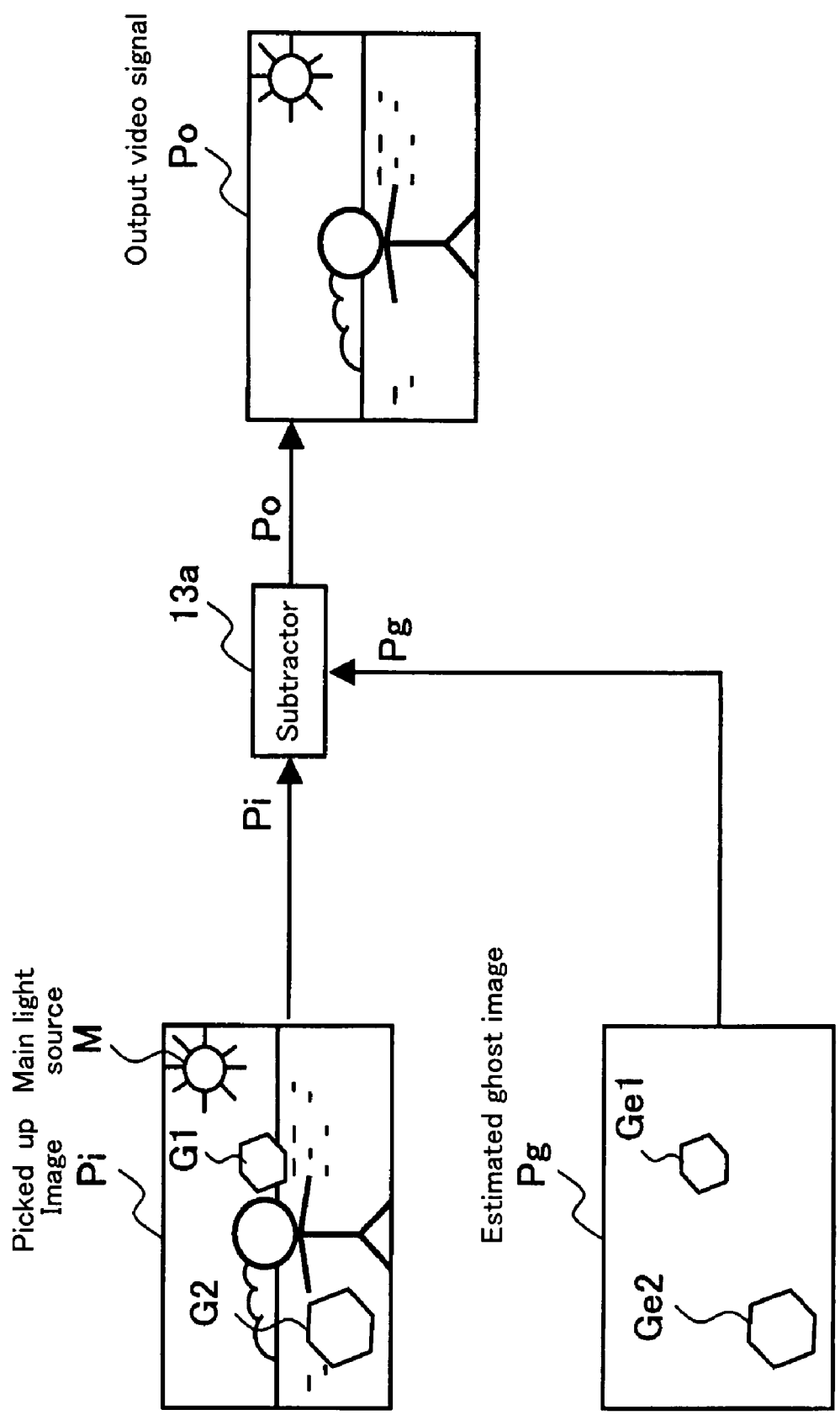
FIG. 2 is an illustration for the principle of correcting a ghost according to the first embodiment of the present invention.

There are cases where a plurality of ghosts G are generated in the picked up image Pi as in FIG. 2, depending on the conditions of the light source, the diaphragm and the lens layout. In such cases, the processing time becomes extremely long if the pattern matching processing is executed for all the ghosts. Therefore, the condition where a plurality of ghosts are generated and the relative positional relationship of each ghost are also calculated in advance through a simulation, and the calculated positional relationship is stored to the condition storage memory 11b within the ghost managing memory 11. By doing this, the positions of the rest of the ghosts can be obtained from a single estimated ghost. Therefore, through detecting at least a single ghost pattern with the matching device 12 from the generated plurality of ghosts, it becomes possible to generate the estimated ghosts of the remaining ghosts at the same time.

Sixth Embodiment

FIG. 12 illustrates the subtraction result (S13) at signal levels of a pixel unit, in the case where a picked up image signal S11 is inputted to the ghost subtractor 13 and the signal level of the estimated ghost at that time is S12. The horizontal axis indicates the signal of each pixel (one by one), and FIG. 12 illustrates the subtraction processing for a total of eight pixels. The ghost component is eliminated through subtracting the estimated ghost S12 from the input signal S11. At that time, the input signal has reached a saturated level, so that the signal level of the pixel where the ghost is generated becomes lower than that of the peripheral pixels if the subtraction processing is performed. Herewith, the ghost is not eliminated by the subtraction. Rather, a ghost with a low signal level, that is, a dark ghost, is generated. In order to avoid such inconvenience, it may be constituted so that the ghost subtractor 13 judges that a signal level of more than a prescribed threshold value among the inputted picked up image is saturated, and determines not to perform subtraction in that case.

The present invention has been described in detail referring to the most preferred embodiments. However, various combinations and modifications of the components are possible without departing from the spirit and the broad scope of the appended claims.

What is claimed is:

1. An imaging system, comprising:
   a signal processing circuit that generates an image signal by performing signal processing to a picked up signal that is obtained through an imaging optical system that includes a lens, a diaphragm, an image sensor and a lens barrel;
   a main light source detector that detects a main light source contained in a picked up image of said image signal;
   an estimated ghost generator that generates an estimated ghost based on layout information of said main light source and said imaging optical system, and structural information of said lens barrel, the estimated ghost being a predetermined ghost image which is predicted to occur;

a matching device that extracts an estimated ghost image by searching said estimated ghost through pattern matching in said picked up image; and a ghost subtractor that subtracts said estimated ghost image from said picked up image, wherein:

said estimated ghost generator generates a first estimated ghost from information concerning luminance and a position of said main light source, information concerning said diaphragm, lens layout and a structure of said lens barrel, and generates a second estimated ghost that has a shape of N times as large as said first estimated ghost (N is an arbitrary real number); and said estimated ghost generator further comprises a storage device for storing said first estimated ghost and said second estimated ghost.

2. The imaging system according to claim 1, wherein said main light source detector detects said main light source based on information of a luminance, a position and a color in said picked up image.

3. The imaging system according to claim 1, wherein said main light source detector detects, as said main light source, an image part that has luminance level more than that in response to an aperture value of said imaging optical system.

4. The imaging system according to claim 1, wherein said main light source detector detects an image part that has luminance level more than that in response to exposure time of said image sensor, as said main light source.

5. The imaging system according to claim 1, wherein said estimated ghost generator:

determines a shape of said estimated ghost based on information concerning a luminance and a position of said main light source;

determines a color of said estimated ghost based on information concerning a color of said main light source; and determines a luminance of said estimated ghost based on information concerning luminance of said main light source.

6. The imaging system according to claim 1, wherein said estimated ghost generator sets a threshold value for luminance of said estimated ghost, and then stops generation of said estimated ghost when luminance of said estimated ghost is lower than said threshold value.

7. The imaging system according to claim 1, wherein said estimated ghost generator sets a threshold value for a size of said estimated ghost based on information concerning luminance and a position of said main light source, and information concerning said diaphragm and lens layout, and stops generation of said estimated ghost when a size of said estimated ghost is lower than said threshold value.

8. The imaging system according to claim 1, wherein said estimated ghost generator further comprises a zooming device for forming a similar shape of said estimated ghost.

9. The imaging system according to claim 5, wherein said estimated ghost generator further comprises a zooming device for forming a similar shape of said estimated ghost.

10. The imaging system according to claim 6, wherein said estimated ghost generator further comprises a zooming device for forming a similar shape of said estimated ghost.

11. The imaging system according to claim 7, wherein said estimated ghost generator further comprises a zooming device for forming a similar shape of said estimated ghost.

12. The imaging system according to claim 1, wherein said matching device extracts an image whose pattern matches said estimated ghost from said picked up image, as said estimated ghost image.

13. The imaging system according to claim 1, wherein said matching device extracts a contour from said picked up image and estimated ghost image respectively, and extracts a position where a difference between the extracted contours becomes smallest as said estimated ghost image.

14. The imaging system according to claim 9, wherein, said matching device selectively takes data near said contour of said estimated ghost as a target of matching judgment, in calculating a difference between a contour of said picked up image and a contour of said estimated ghost image.

15. The imaging system according to claim 9, wherein
said matching device comprises a differential filter for extracting contours from said picked up image and said estimated ghost, wherein
said differential filter is also used as a differential filter that is used for contour correction processing in said signal processing circuit.

16. The imaging system according to claim 1, wherein
said matching device comprises a pattern matching engine, wherein said pattern matching is used also as a motion detect engine for encoding a moving picture.

17. The imaging system according to claim 1, wherein, upon detecting at least one of said estimated ghost patterns, said matching device presumes another estimated ghost image that is generated simultaneously, based on a result of a simulation performed in advance.

18. The imaging system according to claim 1, wherein said ghost subtractor subtracts said estimated ghost image that said matching device has considered to accord with said estimated ghost in said picked up image, from said picked up image.

19. The imaging system according to claim 1, wherein said ghost subtractor stops subtraction processing of said estimated ghost image, with respect to a saturated part within said picked up image.

20. A digital camera, comprising:
an imaging optical system for forming an image;
an image sensor which photographs said image and generates an electric signal; and
said imaging system of claim 1, which performs signal processing to said electric signal.

* * * * *